United States Patent [19]

Cromer, Jr.

[11] 4,347,913

[45] Sep. 7, 1982

[54] CHAIR LIFT

[76] Inventor: John A. Cromer, Jr., P.O. Box 597, Aiken, S.C. 29801

[21] Appl. No.: 175,034

[22] Filed: Aug. 4, 1980

[51] Int. Cl.³ .................... A01M 31/02; A47F 3/26; A47C 9/10
[52] U.S. Cl. ................................ 182/142; 182/150
[58] Field of Search ............... 182/142, 187, 145; 187/20, 27; 254/343; 297/274, 277

[56] References Cited

U.S. PATENT DOCUMENTS

| 194,544 | 8/1877 | Bacon et al. | 182/232 |
|---|---|---|---|
| 2,524,351 | 10/1950 | Jensen | 254/343 |
| 2,918,136 | 12/1959 | Faugier | 182/142 |
| 3,568,797 | 3/1971 | Hardy | 182/142 |
| 3,731,762 | 5/1973 | Sirls | 182/142 |
| 3,957,135 | 5/1976 | Lane | 182/142 |
| 4,018,259 | 4/1977 | Herms | 160/133 |
| 4,205,733 | 6/1980 | Wade | 182/142 |

FOREIGN PATENT DOCUMENTS

| 1341538 | 9/1963 | France | 182/142 |
|---|---|---|---|
| 625310 | 9/1961 | Italy | 182/142 |

Primary Examiner—Reinaldo P. Machado

[57] ABSTRACT

A portable chair lift for use by a hunter and the like for raising the person off the ground by means of a line extending over a limb. The device includes a frame member which has a seat hung downwardly therefrom on ropes. A worm gear assembly is carried by the frame member to which a hand operated crank is connected for rotating the worm. A pulley is carried on the same shaft as a gear forming part of the worm gear assembly and has a coiled length of web material provided therefrom. The rope is tied to the end of the web material. As a result of the worm gear, the chair lift can be raised with very little effort and the web material aids in stabilizing the chair. The entire chair is collapsible into a compact package for transporting from one site to another.

4 Claims, 3 Drawing Figures

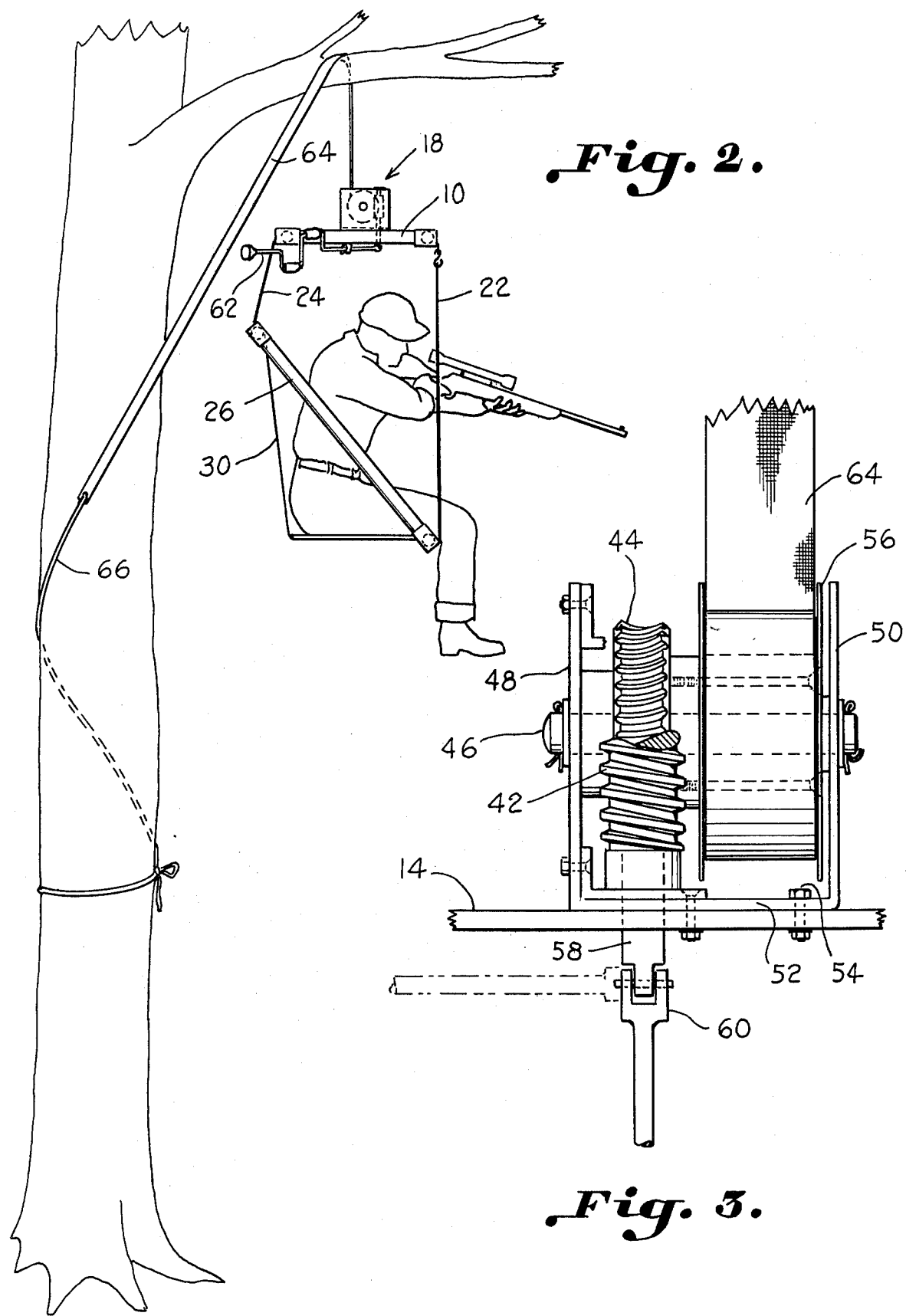

CHAIR LIFT

BACKGROUND OF THE INVENTION

Heretofore, hunters have utilized all types of stands that can be mounted in trees above the ground. The most common stand is a permanent stand built in the tree and access is provided thereto by means of a ladder. One problem with such a stand is that it is not readily movable from one location to another and requires a ladder to gain access thereto.

In order to overcome the above problem, attempts have been made to provide chair lifts that can be readily raised to any desired height within a tree.

One particular chair lift is disclosed in U.S. Pat. No. 3,568,797. As can be seen, a complicated apparatus is required for holding the lift mechanism away from the tree. Considerable effort is also required for rotating the pulley with the hand crank.

In U.S. Pat. Nos. 2,918,136 and 3,731,762 there are disclosed still other chair lifts wherein hand cranks are used for raising the lift to a desired height within a tree or the like.

SUMMARY OF THE INVENTION

In accordance with the present invention, a chair lift is provided to raise a man to a desired height for hunting deer (0-30 feet approximately) and it can also be used as an observation chair for use in any location wherein it is desired to be raised above the ground level. The only requirement is that there be a support member such as a limb, provided upon which the chair can be raised. The chair lift includes a substantially rectangular frame member which has a seat hung by ropes therefrom. A gear assembly is carried by the frame and includes a rotatable worm which meshes with another gear carried on a horizontal shaft. Fixed to the shaft extending through the gear is a pulley. A coil of line is carried on the pulley. A hand operated crank extends downwardly from the worm adjacent the seat of the chair so that an occupant can easily rotate the worm with a minimum of effort for raising the chair.

The seat portion of the chair is collapsible so that the entire chair lift can be readily collapsed into a relatively small package for transporting. The seat includes a rectangular rigid frame supported on an angle with an upper end supported vertically above a lower end. A canvas support sheet extends between the upper and lower ends of the frame. A rigid base such as a sheet of plywood, is attached to a portion of the canvas sheet which is adjacent the lower end and extends horizontally rearwardly from the lower end of the frame member so as to define a substantially right angle seat upon which the occupant sits.

A coil of web material is carried on the pulley and has a rope attached to the free end thereof. In operation, the user merely throws the end of the rope over a limb and ties the rope securely to the trunk of the tree. He then mounts the seat and rotates the worm with the web material extending over the limb. As a result of the width of the web material, the chair is stabilized while it is raised and lowered.

Accordingly, it is an important object of the present invention to provide a simple and efficient chair lift for use by hunters and the like.

Another important object of the present invention is to provide a chair lift where a minimum of effort is required for raising an occupant.

Still another important object of the present invention is to provide a chair lift which can be readily collapsed for transporting to various locations.

Other objects and advantages of this invention will become more apparent from a reading of the following detailed description and attendant claims taken in conjunction with the accompanying drawings, wherein:

BRIEF DESCRIPTION OF THE DRAWINGS

FIG. 2 is a perspective view illustrating a hunter utilizing the chair lift, and FIG. 3 is an enlarged side elevational view illustrating the gear assembly used for raising the chair lift.

DESCRIPTION OF A PREFERRED EMBODIMENT

Figure 1:
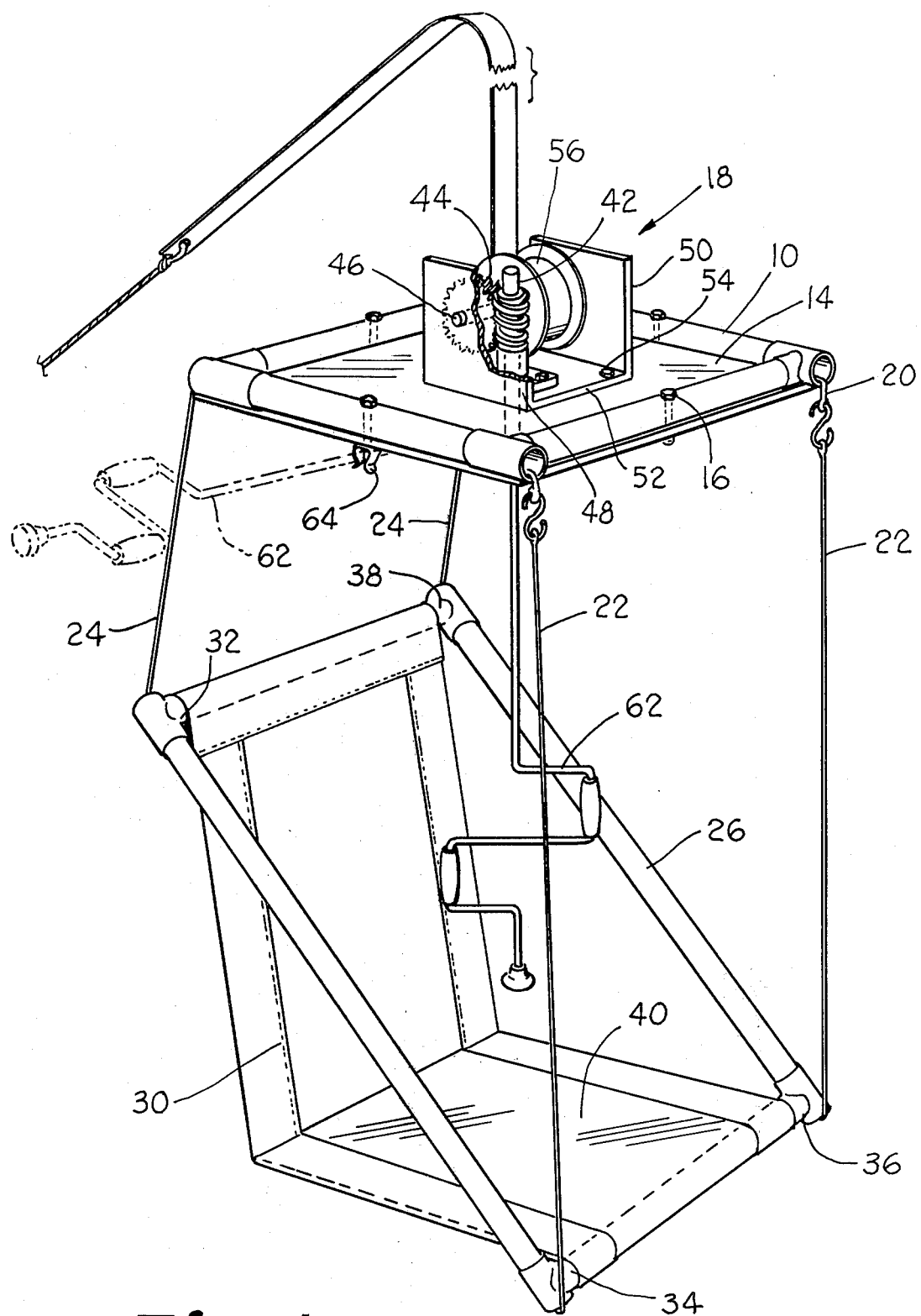
FIG. 1 is a perspective view illustrating a chair lift constructed in accordance with the present invention.

Referring in more detail to FIG. 1 of the drawings, there is illustrated a chair lift constructed in accordance with the present invention. The chair lift includes a substantially rectangular frame member 10 constructed of any suitable material such as aluminum pipe. A plywood board 12 is secured to the frame 10 by means of bolts 16 and provides a platform for a gear assembly generally designated by the reference character 18. Hooks 20 extend through holes provided in the corners of the frame 10 for supporting a seat by means of vertically extending ropes 22 and 24.

The seat assembly includes a rectangular frame 26 that also may be constructed of any suitable material such as aluminum tubing. A canvas sheet 30 provided with sewn loops 32 and 34 is secured to the frame 26 by means of the end members 36 and 38 extending through the loops 34 and 32, respectively. It is noted that the upper end of the frame 26 is much higher than the lower end of the frame as a result of the different lengths of rope 22 and 24 supporting the frame. This enables the canvas sheet 30 to extend substantially vertically downwardly providing a back for the seat, and then horizontally forward to the front lower end of the frame 26.

A plywood board 40 is attached to a portion of the canvas so as to produce a substantially horizontal seat as shown.

The gear assembly 18 includes a worm 42 that meshes with a gear 44 carried on a shaft 46 that is journaled between end plates 48 and 50 of a U-shaped bracket. The base 52 of the U-shaped bracket is attached to the top plywood surface 14 of the frame by bolts 54, or any other suitable means.

A pulley 56 is also carried on the shaft 46 for being rotated with the gear and the shaft as they are, in turn, rotated by means of the worm 44.

The worm 42 has a vertically extending shaft 58 integral therewith which passes through a hole provided in the bracket and the plywood support 14. An end 60 of the crank arm 62 is pivotally connected to the shaft 58 forming part of the worm gear 42. A clamp 64 is carried by the frame 10 so that the crank arm, when not in use, can be pivoted up to a laterally extending position such as shown in FIG. 1, out of the way of the occupant of the chair lift.

A coil of web material 64 is carried on the pulley 56 and has a rope 66 attached to the free end thereof. The web material may be any suitable web material having sufficient strength to support the chair lift and being of a width sufficient to aid in stabilizing the chair lift once it is raised off the ground so as to minimize rotation thereof.

In operation, the user of the chair lift normally in transporting the lift, collapses the seat portion flush against the upper frame 10 so that the chair lift forms a compact substantially rectangular shaped package. Upon reaching a tree or the like wherein it is desired to locate the chair, the end of the rope is thrown over a limb or any other suitable support and drawn down to the trunk of the tree and secured thereto as by tieing a knot therein. The occupant then mounts the seat of the chair lift and begins to rotate the crank arm 62 causing the web material 64 to be coiled on the pulley 56. As a result of the worm gear, a person weighing approximately 225 pounds is only required to use approximately 7½ pounds of energy to rotate the crank in order to raise the chair lift to the desired height.

While a preferred embodiment of the invention has been described using specific terms, such description is for illustrative purposes only, and it is to be understood that changes and variations may be made without departing from the spirit or scope of the following claims.

What is claimed is:

1. A chair lift for use by a hunter and the like for raising a person off the ground by means of a line extending over a support member comprising:
   a substantially rectangular rigid frame member;
   a seat hung from said frame member;
   a gear assembly carried on top of said substantially rectangular rigid frame member;
   said gear assembly including,
   (i) a rotatable worm,
   (ii) a gear meshing with said worm,
   (iii) a shaft extending through said gear and being rotated therewith,
   (iv) a pulley carried by said shaft;
   a coil of line carried on said pulley; and
   a hand-operated crank arm connected to said worm and extending downwardly through said substantially rectangular rigid frame member adjacent said seat so that said crank can be manually rotated by an occupant of said seat.

2. A chair lift for use by a hunter and the like for raising a person off the ground by means of a line extending over a support member comprising:
   a frame member;
   a seat hung from said frame member;
   a gear assembly carried by said frame;
   said gear assembly including,
   (i) a rotatable worm,
   (ii) a gear meshing with said worm,
   (iii) a shaft extending through said gear and being rotated therewith,
   (iv) a pulley carried by said shaft,
   a coil of line carried on said pulley; and
   a hand-operated crank arm connected to said worm and extending downwardly therefrom adjacent said seat so that said crank can be manually rotated by an occupant of said seat,
   said seat including,
   (i) a rectangular rigid frame supported on an angle with an upper end supported vertically above a lower end,
   (ii) a canvas support sheet extending between said upper end of said frame and said lower end,
   (iii) a rigid base carried by said support sheet providing a substantially horizontal base upon which an occupant of said chair lift sits, and
   said seat being collapsible against said frame member producing a compact package so that a person can readily carry said chair lift from one location to another.

3. The chair lift as set forth in claim 1 further comprising:
   said coil of line including;
   (i) a coil of flat web material of sufficient length to extend from said pulley over said support member, and
   (ii) a length of rope connected to a free end of said web material,
   whereby said web material when extending over said support member aids in stabilizing said chair lift against rotation.

4. The chair lift as set forth in claim 1 further comprising:
   one end of said crank arm being pivotally connected to said worm gear;
   a clamping member carried by said frame member for holding said crank arm laterally out from said frame member when not in use.

* * * * *